United States Patent
Cho (10) Patent No.: US 9,846,239 B2
(45) Date of Patent: Dec. 19, 2017

(54) GNSS RECEIVER AND CALCULATING METHOD FOR PSEUDO-RANGE AND POSITION DETERMINATION THEREOF

(71) Applicant: JaeBum Cho, Seoul (KR)

(72) Inventor: JaeBum Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 858 days.

(21) Appl. No.: 14/095,491

(22) Filed: Dec. 3, 2013

(65) Prior Publication Data

US 2014/0152496 A1  Jun. 5, 2014

(30) Foreign Application Priority Data

Dec. 4, 2012  (KR) ........................ 10-2012-0139771

(51) Int. Cl.
  *G01S 19/06*  (2010.01)
  *G01S 19/07*  (2010.01)
  *G01S 19/41*  (2010.01)
  *G01S 19/13*  (2010.01)

(52) U.S. Cl.
  CPC .............. *G01S 19/13* (2013.01); *G01S 19/07* (2013.01); *G01S 19/41* (2013.01)

(58) Field of Classification Search
  CPC .................................. G01S 19/07; G01S 19/41
  USPC ............ 342/357.24, 357.43, 357.44, 357.51; 701/469, 470
  See application file for complete search history.

(56) References Cited

U.S. PATENT DOCUMENTS

| | | | |
|---|---|---|---|
| 5,490,073 A | * | 2/1996 | Kyrtsos ................... G01S 19/41 342/357.24 |
| 5,884,220 A | | 3/1999 | Farmer et al. |
| 6,104,338 A | * | 8/2000 | Krasner ................... G01S 19/41 342/357.24 |
| 6,229,478 B1 | | 5/2001 | Biacs et al. |
| 7,095,368 B1 | | 8/2006 | van Diggelen |
| 7,119,742 B2 | | 10/2006 | Cho |
| 7,671,790 B2 | | 3/2010 | Kurata |
| 7,893,869 B2 | | 2/2011 | Gaal et al. |
| 8,026,847 B2 | | 9/2011 | Pon |
| 8,155,875 B2 | | 4/2012 | Onda |

(Continued)

FOREIGN PATENT DOCUMENTS

| | | |
|---|---|---|
| CN | 1356560 | 7/2002 |
| CN | 1519579 | 8/2004 |

(Continued)

OTHER PUBLICATIONS

Chinese Office Action dated Nov. 28, 2016 issued in counterpart application No. 201310646643.9, 5 pages.

*Primary Examiner* — Dao L Phan (74) *Attorney, Agent, or Firm* — The Farrell Law Firm, P.C.

(57) ABSTRACT

Methods and apparatus are provided for calculating a pseudo-range and position in a global navigation satellite system receiver. A first pseudo-range of a satellite is calculated for position determination of the global navigation satellite system receiver. A second pseudo-range of the satellite is calculated for position correction of the global navigation satellite system receiver. A differential operation is performed using the first pseudo-range and the second pseudo-range to eliminate an error. A more precise pseudo-range of the satellite is calculated using the differential pseudo-range.

18 Claims, 8 Drawing Sheets

(56) References Cited

U.S. PATENT DOCUMENTS

| | | |
|---|---|---|
| 8,180,000 B2 | 5/2012 | Normark et al. |
| 8,310,395 B2 | 11/2012 | Oehler |
| 8,380,433 B2 | 2/2013 | Roh et al. |
| 8,902,104 B2 | 12/2014 | van Diggelen |
| 2002/0032525 A1* | 3/2002 | Yoshikawa ............ G01S 5/0072 701/470 |

FOREIGN PATENT DOCUMENTS

| | | |
|---|---|---|
| CN | 101206258 | 6/2008 |
| EP | 1881341 | 1/2008 |
| KR | 1020070114321 | 11/2007 |
| KR | 1020090062473 | 6/2009 |

\* cited by examiner

GNSS RECEIVER AND CALCULATING METHOD FOR PSEUDO-RANGE AND POSITION DETERMINATION THEREOF

PRIORITY

This application claims priority under 35 U.S.C. §119(a) to Korean Patent Application No. 10-2012-0139771 filed Dec. 4, 2012, in the Korean Intellectual Property Office, the contents of which are incorporated herein by reference.

BACKGROUND

1. Field of the Invention

The present invention relates to a Global Navigation Satellite System (GNSS) receiver, and pseudo-range and position calculating methods thereof.

2. Description of the Related Art

In a position determination procedure using a GNSS, a distance between a receiver and a satellite may be calculated by measuring a time delay of an arriving radio wave transmitted from the satellite. A position of the receiver may be calculated using geometric trigonometry. In general, a GNSS navigation Kalman filter may utilize a system equation including a position, a velocity, a clock error, and a PV model on a clock error variation rate, which is generally used for position estimation of a navigation object that moves in a three-dimensional space. A measurement equation of a navigation filter may be expressed using a pseudo-range from a visible satellite.

SUMMARY

The present invention has been made to address at least the above problems and/or disadvantages and to provide at least the advantages described below. Accordingly, an aspect of the present invention provides a pseudo-range calculating method of a global navigation satellite system receiver.

According to one aspect of the present invention, a method is provided for calculating a pseudo-range in a global navigation satellite system receiver. A first pseudo-range of a satellite is calculated for position determination of the global navigation satellite system receiver. A second pseudo-range of the satellite is calculated for position correction of the global navigation satellite system receiver. A differential operation is performed using the first pseudo-range and the second pseudo-range to eliminate an error. A more precise pseudo-range of the satellite is calculated using the differential pseudo-range.

According to another aspect of the present invention, a method is provided for calculating a pseudo-range in a global navigation satellite system receiver. It is determined whether the global navigation satellite system receiver is in an augmented mode. A pseudo-range calculated in a previous position determination operation is corrected through an augmented channel in the augmented mode. A position of the global navigation satellite system receiver is calculated using the corrected pseudo-range.

According to an additional aspect of the present invention, a global navigation satellite system receiver in provided, which includes a mode selection unit configured to select one of a normal mode and an augmented mode. The global navigation satellite system receiver also includes a satellite capturing unit configured to be connected to a plurality of satellites through a normal channel for a position determination operation in the normal mode, and to be connected to a satellite, which satisfies a predetermined condition, from among the plurality of satellites, through an augmented channel for position correction in the augmented mode. The global navigation satellite system receiver further includes a pseudo-range calculation unit configured to calculate a first pseudo-range of the satellite in the normal mode and a second pseudo-range of the satellite in the augmented mode, and to correct a pseudo-range of the satellite using the first and second pseudo-ranges.

According to a further aspect of the present invention, a global navigation satellite system receiver is provide, which includes a first receiver configured to calculate a position based on position information received from an external device. The global navigation satellite system receiver also includes a second receiver configured to calculate a position through a normal channel and to correct position determination through an augmented channel, which is not allocated as the normal channel. The second receiver corrects a pseudo-range by calculating first pseudo-ranges of satellites for position determination, calculating a second pseudo-range for a satellite, which satisfies a predetermined condition, from among the satellites, for position correction, and performing a differential operation using the first and second pseudo-ranges of the satellite. The second receiver calculates a position of the global navigation satellite system receiver using the corrected pseudo-range.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The inventive concept of the present invention may be embodied in various forms, and should not be construed as being limited only to the illustrated embodiments. Rather, these embodiments are provided as examples so that this disclosure will be thorough and complete, and will fully convey the concept of the present invention to those skilled in the art. In the drawings, the sizes and relative sizes of layers and regions may be exaggerated for clarity.

It will be understood that, although the terms "first", "second", "third", etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to limit the present invention. As used herein, the singular forms "a", "an", and "the" are intended to include the plural forms as well, unless the context clearly indicates otherwise. As used herein, the term "and/or" includes any and all combinations of one or more of the associated listed items.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and will not be interpreted in an idealized or overly formal sense unless expressly so defined herein.

Figure 1:
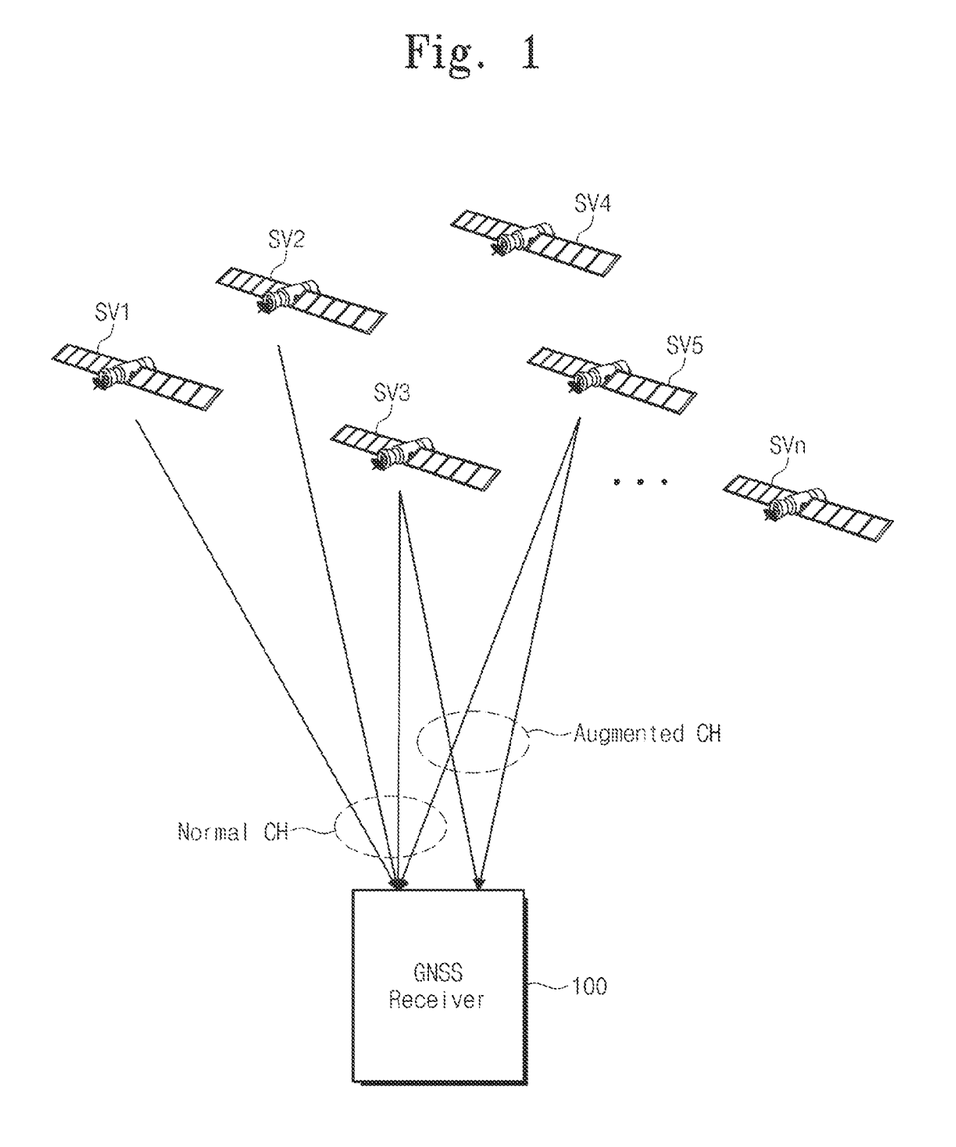
FIG. 1 is a diagram illustrating a GNSS receiver, according to an embodiment of the present invention.

FIG. 1 is a diagram illustrating a GNSS receiver 100, according to an embodiment of the present invention. Referring to FIG. 1, the GNSS receiver 100 may be implemented to determine position through a normal channel and to compensate for the position determination through an augmented channel.

The normal channel includes communication channels through which allocated satellites (e.g., SV1, SV2, SV3, and SV5) of a plurality of satellites, SV1 to SVn, are connected with the GNSS receiver 100. The GNSS receiver 100 may communicate with the satellites SV1, SV2, SV3, and SV5 through the normal channel to receive satellite information. The satellites SV1, SV2, SV3, and SV5, calculate first pseudo-ranges, each corresponding to the satellites SV1, SV2, SV3, and SV5, and a position of the GNSS receiver 100 is determined based on the first pseudo-ranges. The pseudo-range may be a range including various error components between a satellite and the GNSS receiver 100.

The augmented channel includes a communication channel connected with at least one satellite, which satisfies a particular condition, from among the allocated satellites SV1, SV2, SV3, and SV5. In an embodiment of the present invention, the particular condition may involve, for example, at least one of a signal strength, a Dilution Of Precision (DOP), an elevation, an azimuth, a multipath, etc. The GNSS receiver 100 may perform range correction by communicating with the satellites SV3 and SV5 through the augmented channel to receive satellite information. The satellites SV3 and SV5 calculate second pseudo-ranges, each corresponding to the satellites SV3 and SV5, and perform a differential operation with respect to the first pseudo-range at the second pseudo-range.

The GNSS receiver 100 may calculate a pseudo-range based on the range correction performed using the augmented channel, and may determine a position of the GNSS receiver 100 based on the calculated pseudo-range.

A conventional GNSS receiver may use a fixed reference station to perform the differential operation for reducing a common error. However, such a GNSS receiver may be problematic in that it communicates with the reference station separately and does not correct a multipath error. The multipath error may be affected by an environment where a GNSS receiver is placed, and may be generated when a transmitted signal is affected by a signal reflected by a peripheral environment According to an embodiment of the present invention, the GNSS receiver 100 may remove a common error caused by a satellite using the augmented channel. Thus, the GNSS receiver 100 may not require a separate reference station, and may reduce a multipath error. As a result, when compared with a conventional GNSS receiver, the GNSS receiver 100, according to an embodiment of the present invention, may easily determine a position with high accuracy.

Figure 2:
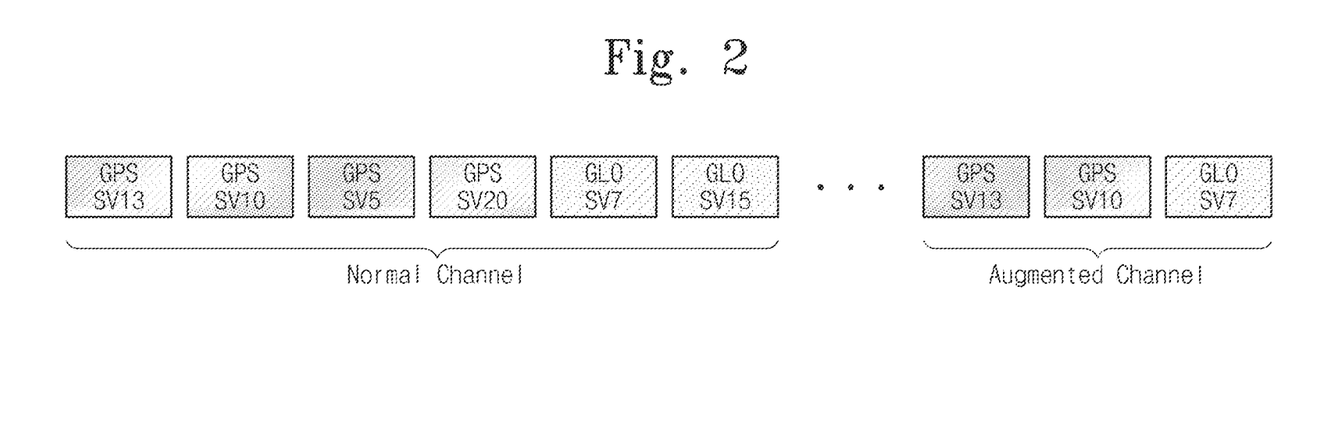
FIG. 2 is a diagram illustrating a normal channel and an augmented channel, according to an embodiment of the present invention.

FIG. 2 is a diagram illustrating a normal channel and an augmented channel, according to an embodiment of the present invention. Referring to FIG. 2, satellites SV13, SV10, SV5, and SV20 in a GPS of a U.S. domain, and satellites SV7 and SV15 in a GLO of a Russian domain, may be allocated to a normal channel of the GNSS receiver 100 (refer to FIG. 1) for position determination. Satellites SV13, SV10, and SV7, which satisfy a particular condition, from among the satellites SV13, SV10, SV9, SV20, SV7, and SV15 allocated to the normal channel, may be allocated to an augmented channel for position correction. The augmented channel may be an unused communication channel, which is not allocated as a normal channel used for position determination.

The GNSS receiver 100, according to an embodiment of the present invention, may be configured to select a mode for compensating for position determination through the augmented channel.

Figure 3:
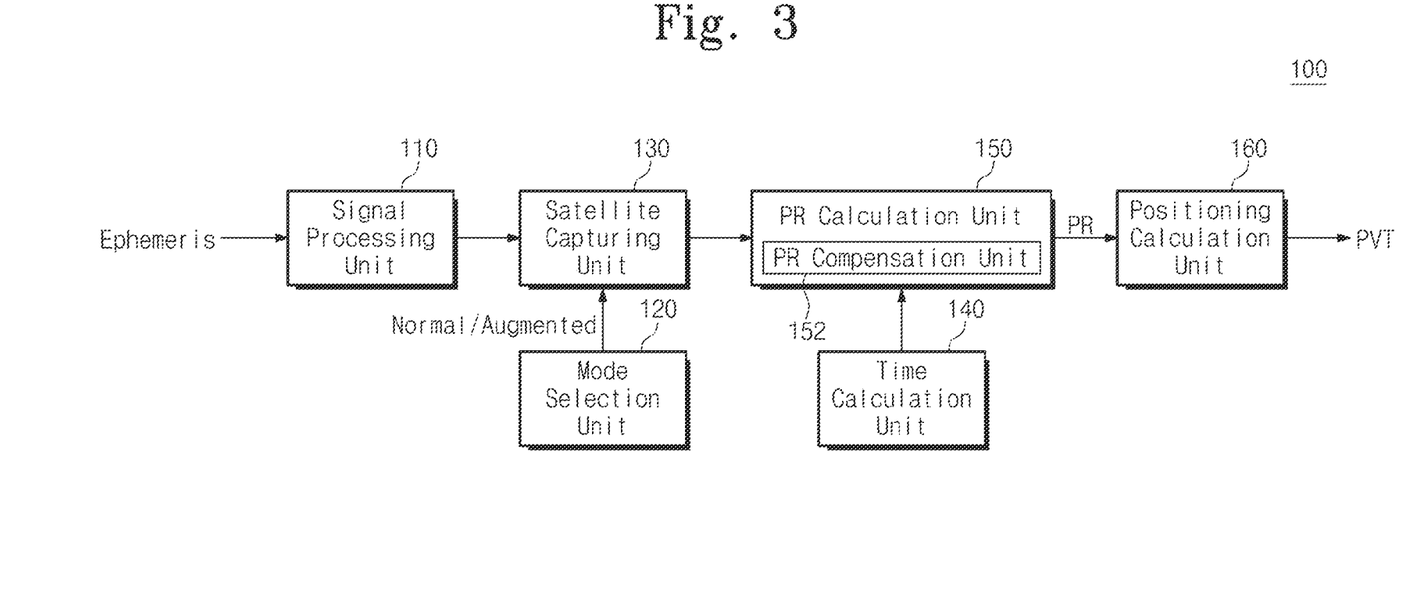
FIG. 3 is a block diagram illustrating a GNSS receiver, according to an embodiment of the present invention.

FIG. 3 is a block diagram illustrating the GNSS receiver 100, according to an embodiment of the present invention. Referring to FIG. 3, the GNSS receiver 100 includes a signal processing unit 110, a mode selection unit 120, a satellite capturing unit 130, a time calculation unit 140, a Pseudo-Range (PR) calculation unit 150, and a position calculation unit 160.

The signal processing unit 110 may receive satellite navigation signals generated from satellites SV1 to SVn, and may process the input satellite navigation signals for conversion to baseband signals.

The mode selection unit 120 may determine a position determination selection mode. For example, the mode selection unit 120 may select one of a normal mode and an augmented mode. In the normal mode, position determination may be performed through a normal channel. In the augmented mode, position correction may be performed through an augmented channel.

In an embodiment of the present invention, the mode selection unit 120 may be configured for a user of the GNSS receiver 100 to select a normal mode or an augmented mode in hardware/software/firmware. In other embodiments of the present invention, the mode selection unit 120 may be configured to select a normal mode or an augmented mode internally at the GNSS receiver.

In the normal mode, the satellite capturing unit 130 may allocate a satellite satisfying a condition for position determination, capture a satellite navigation signal of the allocated satellite using the normal channel, and output satellite information of the captured satellite navigation signal. The condition for position determination may be the strength of the satellite navigation signal. The satellite navigation signal may be captured by receiving the satellite navigation signal in synchronization. The satellite capturing unit 130 may decode the input satellite navigation signal in order to output navigation data. The navigation data may include satellite information. In an embodiment of the present invention, the satellite information may include information associated with a position, a time, and a velocity of the satellite corresponding to the captured satellite navigation signal.

In the augmented mode, the satellite capturing unit 130 may capture a satellite navigation signal, which satisfies a particular condition, from among satellites used in the normal mode, using an augmented channel.

The time calculation unit 140 may calculate a time difference between time information of a satellite and a time delayed from current time information. The time calculation unit 140 may include an oscillator for calculating the time difference.

The PR calculation unit 150 may calculate a pseudo-range based on satellite information from the satellite capturing unit 130 and a time difference from the time calculation unit 140. The PR calculation unit 150 includes a PR compensation unit 152, which compensates for the pseudo-range by performing a differential operation using a second pseudo-range calculated in the augmented mode and a first pseudo-range calculated in the normal mode, and outputting the differential pseudo-range.

The position calculation unit 160 may calculate and output Position/Velocity/Time (PVT) information of the GNSS receiver 100 based on the differential pseudo-range output from the PR calculation unit 150.

The GNSS receiver 100, according to an embodiment of the present invention, may calculate a pseudo-range according to a selected normal/augmented mode.

Figure 4:
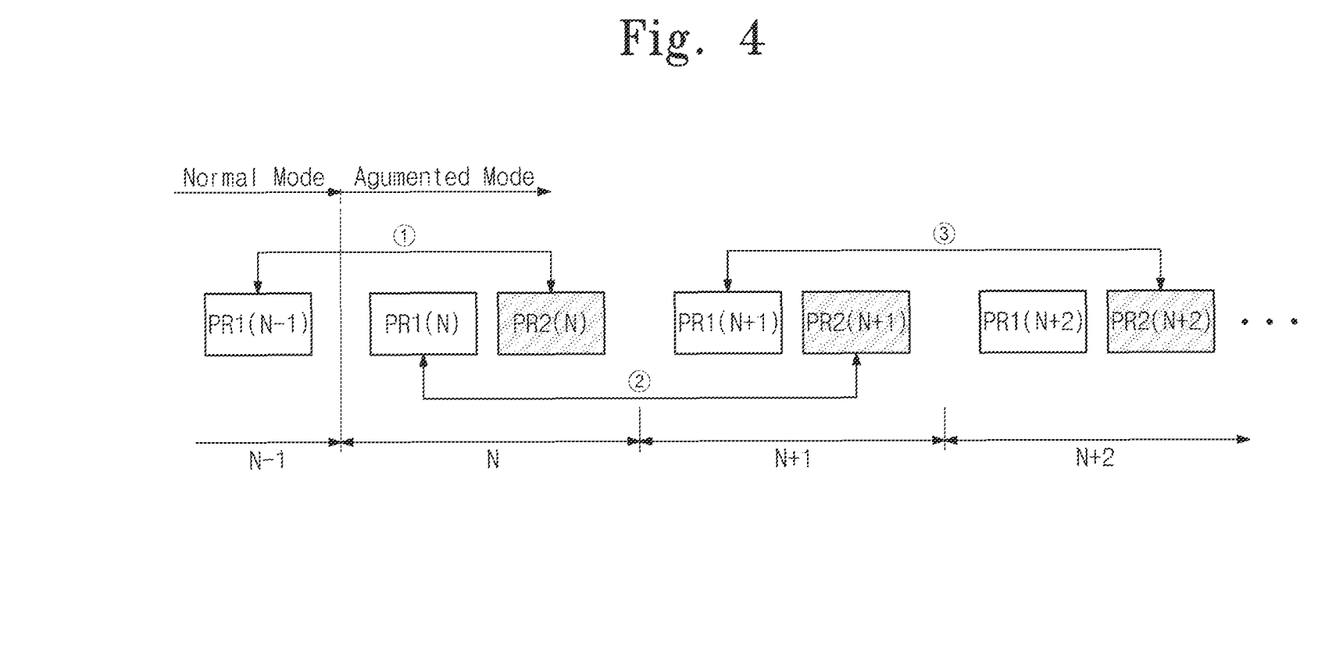
FIG. 4 is a diagram illustrating a pseudo-range calculating method, according to an embodiment of the present invention.

FIG. 4 is a diagram illustrating a pseudo-range calculating method, according to an embodiment of the present invention. Referring to FIG. 4, at a (N−1)th pseudo-range calculation operation, the GNSS receiver 100 (refer to FIG. 1) may operate in a normal mode. A first pseudo-range PR1 (N−1) may be calculated using a normal channel.

At an Nth pseudo-range calculation operation, the GNSS receiver 100 may operate in an augmented mode. A first pseudo-range PR1(N) may be calculated using the normal channel, and a second pseudo-range PR2(N) may be calculated using the augmented channel.

The GNSS receiver 100 may correct a pseudo-range by performing a differential operation on the first pseudo-range PR1(N−1) using the normal channel and the second pseudo-range PR2(N) using the augmented channel. A common error may be reduced by correcting the pseudo-range.

The GNSS receiver 100 may correct a pseudo-range by performing the differential operation on the first pseudo-range PR1(N) using the normal channel and a second pseudo-range PR2(N+1) using the augmented channel. Similarly, the GNSS receiver 100 may correct a pseudo-range by performing the differential operation on a first pseudo-range PR1(N+1) using the normal channel and a second pseudo-range PR2(N+2) using the augmented channel.

When using the pseudo-range calculation method of embodiments of the present invention, a first pseudo-range using a normal channel may be calculated at a predetermined period of time, a second pseudo-range using an augmented channel may be calculated, a differential operation is performed on the first pseudo-range calculated at a previous period of time and the second pseudo-range calculated at a current period of time, and a pseudo-range may be corrected according to the result.

Figure 5:
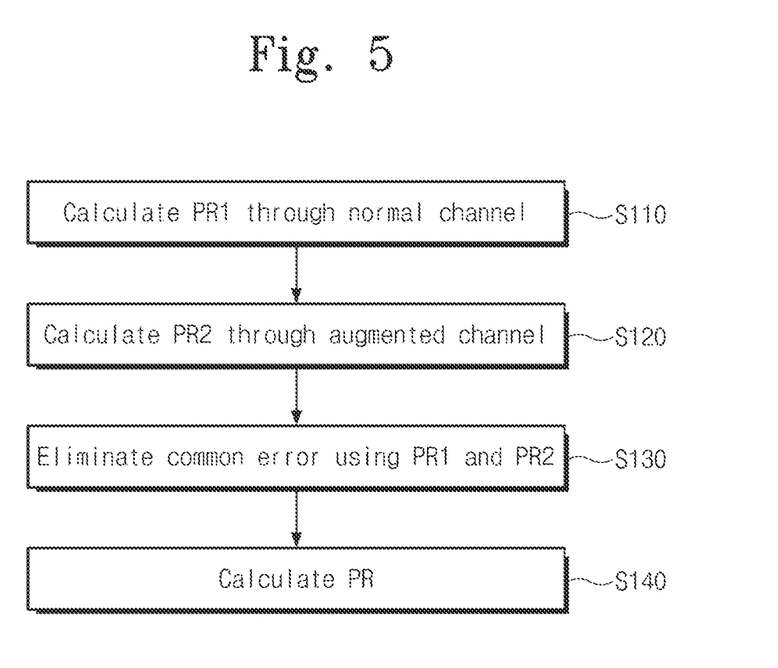
FIG. 5 is a flow chart illustrating a pseudo-range calculation method, according to an embodiment of the present invention.

FIG. 5 is a flow chart illustrating a pseudo-range calculation method, according to an embodiment of the present invention. The pseudo-range calculation method is described with reference to FIGS. 1 and 5.

In step S110, a first pseudo-range PR1 is calculated using signals from each of the satellites allocated for position determination through a normal channel. In step S120, a second pseudo-range PR2 is calculated using a signal from a satellite allocated for position determination through an augmented channel. A satellite allocated for position correction may be a satellite, which satisfies a particular condition, selected from among satellites allocated for position determination. In step S130, the first pseudo-range is calculated based on first satellite information input through the normal channel, and a common error is eliminated using the first and second pseudo-ranges PR1 and PR2. In step S140, a precise pseudo-range, from which the common error is eliminated, is calculated.

When using the pseudo-range calculation method of embodiments of the present invention, a first pseudo-range PR1 of a satellite using a normal channel is calculated, a second pseudo-range PR2 of the same satellite using an augmented channel is calculated, and a precise pseudo-range, from which a common error is eliminated, is calculated using the first and second pseudo-ranges PR1 and PR2.

Figure 6:
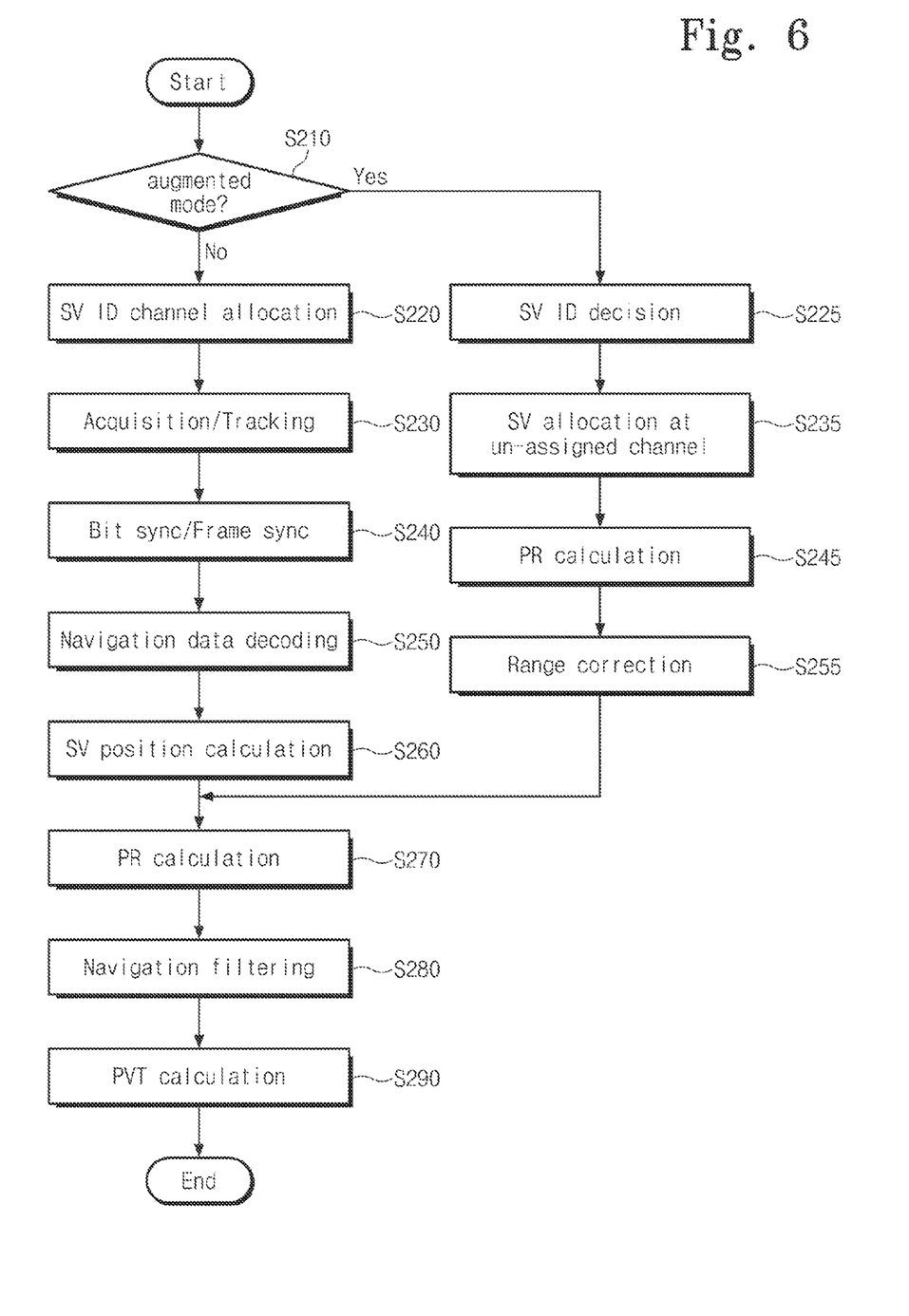
FIG. 6 is a flow chart illustrating a position determination method of a GNSS receiver, according to an embodiment of the present invention.

FIG. 6 is a flow chart illustrating a position determination method of the GNSS receiver 100, according to an embodiment of the present invention. A position determination method of the GNSS receiver 100 is described with reference to FIGS. 3 and 6.

In step S210, the mode selection unit 120 determines whether a position determining operation of the GNSS receiver 100 is an augmented mode.

If the position determining operation of the GNSS receiver 100 is in a normal mode, and not the augmented mode, a communication channel is allocated for a satellite ID, in step S220. In step S230, the satellite capturing unit 130 acquires and tracks a satellite navigation signal through the allocated channel. Acquisition of the satellite navigation signal may include a search for, a discernment of, and a detection of the satellite navigation signal. Tracking of the satellite navigation signal may involve estimating an approximate code alignment and Doppler deviation after acquiring the satellite navigation signal.

In step S240, the satellite capturing unit 130 performs bit or frame synchronization using the tracked satellite navigation signal. Bit synchronization may be performed during a predetermined accumulation time. Frame synchronization may be completed when a parity check is successfully performed by a predetermined number. After the bit or frame synchronization is performed, navigation data is decoded from the input satellite navigation signal, in step S250. The decoded navigation data may include satellite information (e.g., position information, time information, and velocity information of a satellite). In step S260, position information of a satellite is calculated based on the input satellite information. The method then proceeds to step S270.

Returning to step S210, if a position determination operation of the GNSS receiver 100 is in the augmented mode, the satellite capturing unit 130 determines a satellite ID, which satisfies a particular condition, from among satellite IDs previously allocated in a normal mode, in step S225. In step S235, an augmented channel, not allocated in a previous normal mode, is allocated to the satellite corresponding to the satellite ID. In step S245, the PR calculation unit 150 calculates a second pseudo-range based on satellite information of the satellite. In step S255, a range correction is performed by performing a differential operation using a first pseudo-range calculated in a previous normal mode and a second pseudo-range calculated in a current augmented mode. Accordingly, a pseudo-range for the same satellite is calculated using another method, and an error may be eliminated based on the calculated pseudo-range. The method then proceeds to step S270.

In step S270, the PR calculation unit 150 calculates a first pseudo-range in the normal mode and calculates a precise pseudo-range using the first pseudo-range previously calculated in the augmented mode and the range correction. In step S280, the calculated precise pseudo-range is navigation filtered for position tracking of a moving satellite. In an embodiment of the present invention, navigation filtering includes Kalman filtering. In step S290, a position, a velocity, and a time of the GNSS receiver 100 is determined using the filtered pseudo-range.

A position calculation method of the GNSS receiver 100, according to an embodiment of the present invention, provides a more precise position by eliminating a common error using a pseudo-range calculated through an augmented channel.

According to an embodiment of the present invention, the GNSS receiver is a Differential GNSS (DGNSS). A conventional DGNSS receiver may require a reference station to differentially calculate a pseudo-range. According to an embodiment of the present invention, the GNSS receiver is configured to include a function of a conventional DGNSS receiver.

Figure 7:
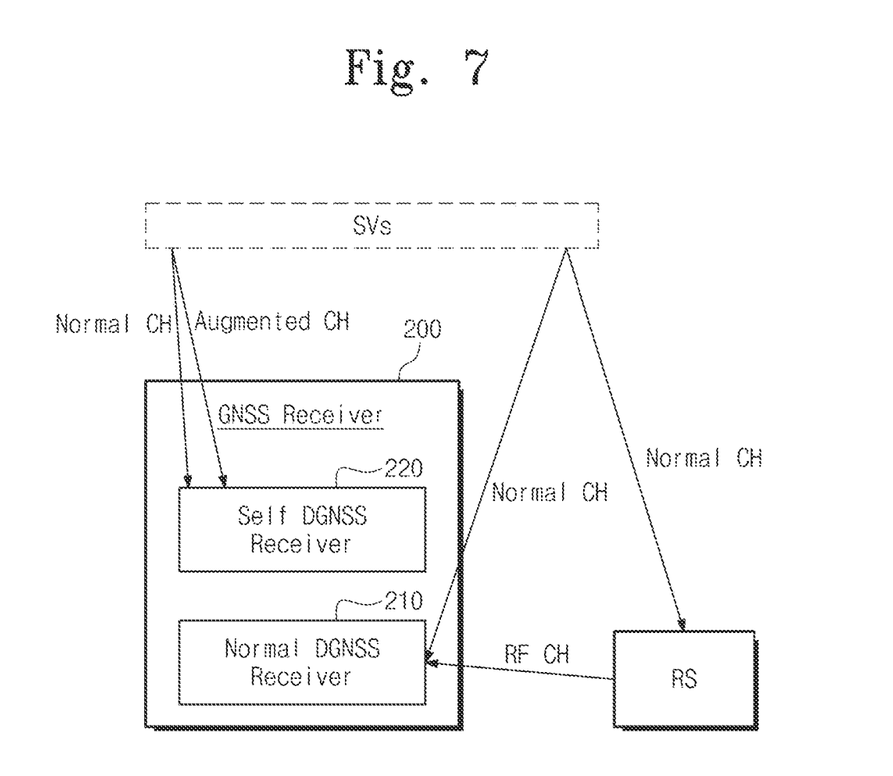
FIG. 7 is a block diagram illustrating a GNSS receiver, according to another embodiment of the present invention.

FIG. 7 is a block diagram illustrating a GNSS receiver 200, according to another embodiment of the present invention. Referring to FIG. 7, the GNSS receiver 200 includes a normal DGNSS receiver 210 and a self DGNSS receiver 220.

The normal DGNSS receiver 210 may calculate a pseudo-range using a reference station RS 230. The self DGNSS receiver 220 may be configured substantially the same as the GNSS receiver 100 of FIG. 1. Specifically, the self DGNSS receiver 220 may calculate a first pseudo-range using a normal channel and a second pseudo-range using an augmented channel, and may correct a pseudo-range using the first and second pseudo-ranges such that a common error is automatically reduced.

According to an embodiment of the present invention, the GNSS receiver 100 can be embodied as an Assisted GNSS (AGNSS). A conventional AGNSS receiver may require position information from an external assistance device to calculate a more precise pseudo-range. According to an embodiment of the present invention, the GNSS receiver 100 may be configured to include a function of the conventional AGNSS receiver.

Figure 8:
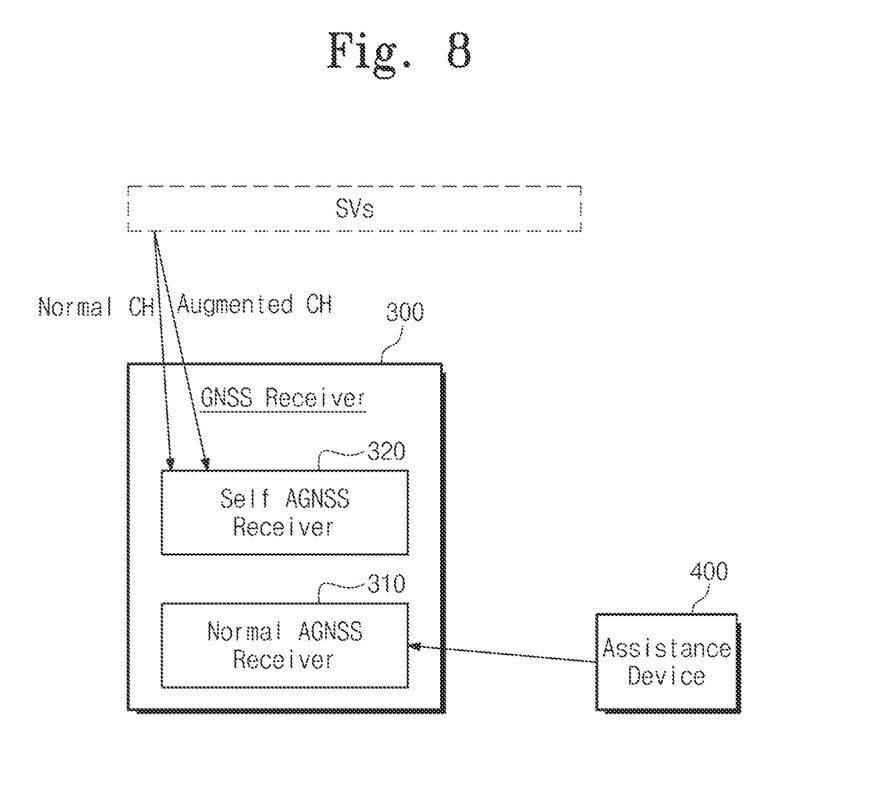
FIG. 8 is a block diagram illustrating a GNSS receiver, according to another embodiment of the present invention.

FIG. 8 is a block diagram illustrating a GNSS receiver 200, according to another embodiment of the present invention. Referring to FIG. 8, a GNSS receiver 300 includes a normal AGNSS receiver 310 and a self AGNSS receiver 320. The normal AGNSS receiver 310 may calculate a position based on position information of the GNSS receiver from an external assistance device 400. In an embodiment of the present invention, the external assistance device 400 may be embodied as another GNSS receiver. In other embodiment of the present invention, the external assistance device 400 may be a network server. However, embodiments of the present invention are not limited the above-described devices. The external assistance device 400 may be a position information providing device capable of providing position information of the GNSS receiver 300.

The self AGNSS receiver 320 may be configured substantially the same as the GNSS receiver 100 of FIG. 1. Specifically, the self AGNSS receiver 320 may calculate a first pseudo-range using a normal channel and a second pseudo-range using an augmented channel, and may correct a pseudo-range using the first and second pseudo-ranges such that a common error is automatically reduced.

A GNSS receiver, according to an embodiment of the present invention, is applicable to a mobile device.

Figure 9:
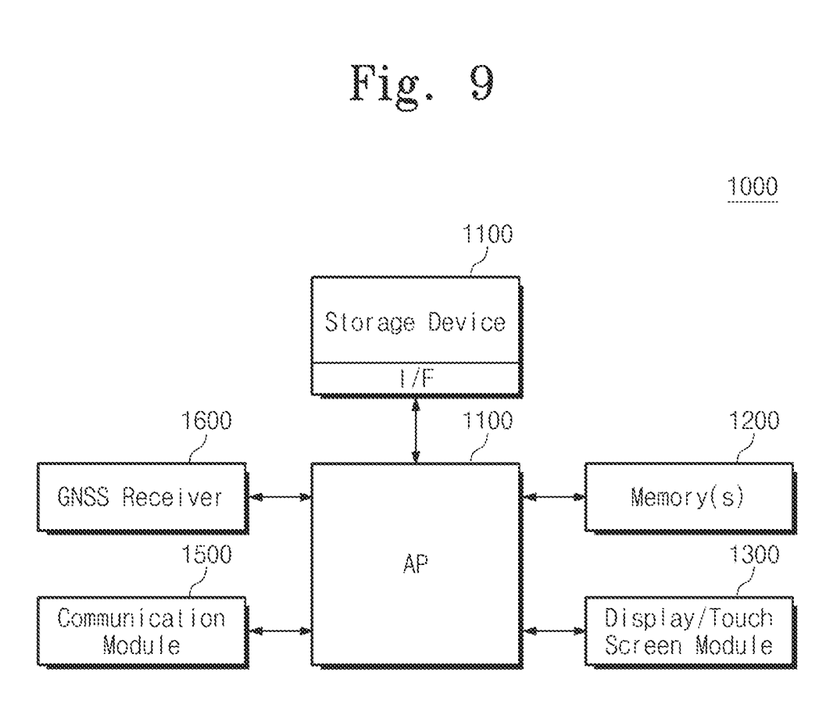
FIG. 9 is a block diagram illustrating a mobile device, according to an embodiment of the present invention.

FIG. 9 is a block diagram illustrating a mobile device 1000, according to an embodiment of the present invention. Referring to FIG. 9, the mobile device 1000 includes an application processor 1100, a memory 1200, a display/touch screen module 1300, a storage device 1400, a communication module 1500, and a GNSS receiver 1600. The GNSS receiver 1600 may be embodied as the GNSS receiver 100 illustrated in FIG. 1, the GNSS receiver 200 illustrated in FIG. 7, or the GNSS receiver 300 illustrated in FIG. 8.

When using the GNSS receiver and position determining method of the present invention, a common error due to a satellite may be eliminated by allocating a satellite, which satisfies a particular condition, to a channel (e.g., an augmented channel), not allocated after a position is fixed, for more precise position determination, and performing a differential operation with a pseudo-range result of a normal channel.

While the invention has been shown and described with reference to certain embodiments thereof, it will be understood by those skilled in the art that various changes in form and detail may be made therein without departing from the spirit and scope of the present invention as defined by the appended claims.

What is claimed is:

1. A global navigation satellite system receiver, comprising:
   a mode selection unit configured to select one of a normal mode and an augmented mode;
   a satellite capturing unit configured to be connected to a plurality of satellites through a normal channel for a position determination operation in the normal mode, and to be connected to a satellite, which satisfies a predetermined condition, from among the plurality of satellites, through an augmented channel for position correction in the augmented mode; and
   a pseudo-range calculation unit configured to calculate a first pseudo-range of the satellite in the normal mode and a second pseudo-range of the satellite in the augmented mode, and to correct a pseudo-range of the satellite using the first and second pseudo-ranges.

2. The global navigation satellite system receiver of claim 1, wherein the plurality of satellites comprises at least three satellites.

3. The global navigation satellite system receiver of claim 1, further comprising:
   a signal processing unit configured to receive navigation signals from the plurality of satellites to process input navigation signals into baseband signals.

4. The global navigation satellite system receiver of claim 1, wherein the predetermined condition is dependent upon at least one of a signal strength, a Dilution Of Precision (DOP), an elevation, an azimuth, and a multipath.

5. The global navigation satellite system receiver of claim 1, further comprising:
a time calculation unit configured to calculate a time difference using time information included in each navigation signal from the plurality of satellites and current time information.

6. The global navigation satellite system receiver of claim 1, further comprising:
a position calculation unit configured to calculate a position by applying navigation filtering to pseudo-ranges input from the plurality of satellites.

7. A global navigation satellite system receiver, comprising:
a first receiver configured to calculate a position based on position information received from an external device; and
a second receiver configured to calculate a position through a normal channel and to correct position determination through an augmented channel, which is not allocated as the normal channel,
wherein the second receiver corrects a pseudo-range by calculating first pseudo-ranges of satellites for position determination, calculating a second pseudo-range for a satellite, which satisfies a predetermined condition, from among the satellites, for position correction, and performing a differential operation using the first and second pseudo-ranges of the satellite, and
wherein the second receiver calculates a position of the global navigation satellite system receiver using the corrected pseudo-range.

8. The global navigation satellite system receiver of claim 7, wherein the global navigation satellite system receiver can also communicate with a plurality of satellites through a normal channel for position determination.

9. The global navigation satellite system receiver of claim 7, wherein the first pseudo-ranges are calculated in a normal mode of the global navigation satellite system receiver.

10. The global navigation satellite system receiver of claim 7, wherein the first and second pseudo-ranges are calculated in an augmented mode of the global navigation satellite system receiver.

11. The global navigation satellite system receiver of claim 7, wherein the external device is a reference station for executing communications with a portable terminal.

12. The global navigation satellite system receiver of claim 11, wherein the reference station calculates a position of the global navigation satellite system receiver using the satellites to eliminate a common error.

13. The global navigation satellite system receiver of claim 7, wherein the external device is another global navigation satellite system receiver.

14. The global navigation satellite system receiver of claim 7, wherein the predetermined condition is dependent upon at least one of a signal strength, a Dilution Of Precision (DOP), an elevation, an azimuth, and a multipath.

15. The global navigation satellite system receiver of claim 7, wherein performing the differential operation using the first pseudo-range and the second pseudo-range in an augmented mode comprises:
performing the differential operation using the first pseudo-range calculated at a previous point in time and the second pseudo-range calculated at a current point in time.

16. A method for calculating a pseudo-range in a global navigation satellite system receiver, the method comprising the steps of:
calculating a first pseudo-range of a satellite of a plurality of satellites for position determination of the global navigation satellite system receiver, wherein the global navigation satellite system receiver communicates with the plurality of satellites through a normal channel for the position determination;
calculating a second pseudo-range of the satellite for position correction of the global navigation satellite system receiver, wherein the global navigation satellite system receiver communicates with the satellite through an augmented channel for position correction;
performing a differential operation using the first pseudo-range and the second pseudo-range to eliminate an error; and
calculating a more precise pseudo-range of the satellite by the differential operation,
wherein the augmented channel is not allocated as the normal channel.

17. A method for calculating a pseudo-range in a global navigation satellite system receiver, the method comprising the steps of:
calculating a first pseudo-range of a satellite for position determination of the global navigation satellite system receiver in a normal mode;
calculating a second pseudo-range of the satellite for position correction of the global navigation satellite system receiver;
performing a differential operation using the first pseudo-range and the second pseudo-range to eliminate an error in an augmented mode; and
calculating a more precise pseudo-range of the satellite by the differential operation.

18. The method of claim 17, wherein performing the differential operation using the first pseudo-range and the second pseudo-range in the augmented mode comprises:
performing the differential operation using the first pseudo-range calculated at a previous point in time and the second pseudo-range calculated at a current point in time.

* * * * *